United States Patent [19]
Davis

[11] Patent Number: 5,568,552
[45] Date of Patent: Oct. 22, 1996

[54] METHOD FOR PROVIDING A ROVING SOFTWARE LICENSE FROM ONE NODE TO ANOTHER NODE

[75] Inventor: Derek L. Davis, Phoenix, Ariz.

[73] Assignee: Intel Corporation, Santa Clara, Calif.

[21] Appl. No.: 472,951

[22] Filed: Jun. 7, 1995

Related U.S. Application Data

[62] Division of Ser. No. 303,084, Sep. 7, 1994.

[51] Int. Cl.$^6$ ...................................................... H04K 1/00
[52] U.S. Cl. ..................... 380/4; 380/23; 380/30
[58] Field of Search ............................. 380/3, 4, 23, 25, 380/30

[56] References Cited

U.S. PATENT DOCUMENTS

| | | | |
|---|---|---|---|
| 4,658,093 | 4/1987 | Hellman | 380/3 |
| 4,807,288 | 2/1989 | Ugon, et al. | 380/30 |

OTHER PUBLICATIONS

Struif, Bruno "The Use of Chipcards for Electronic Signatures and Encryption" in: Proceedings for the 1989 Conference on VLSI and Computer Peripherals, IEEE Computer Society Press, 1989, pp. 4/155–4/158.

Dussé, Stephen R. and Burton S. Kaliski "A Cryptographic Library for the Motorola 56000" in: Damgard, I. M., Advances in Cryptology–Proceedings EUROCRYPT 90, Springer–Verlag, 1991, pp. 230–244.

DSP56000/DSP56001 Digital Signal Processor User–s Manual, Motorola, 1990, p. 2–2.

Primary Examiner—David C. Cain
Attorney, Agent, or Firm—Blakely, Sokoloff, Taylor & Zafman

[57] ABSTRACT

An integrated circuit component for enforcing licensing restrictions. Such enforcement is performed through remote transmission of access privileges for executing a licensed program from the integrated circuit component to another similar component. The integrated circuit component comprising a non-volatile memory for storing a uniquely designated key pair, an authentication device certificate and a manufacturer public key along with cryptographic algorithms, a processor for executing the cryptographic algorithms in order to process information inputted into the integrated circuit component and for transmitting the processed information into volatile memory and a random number generator for generating the uniquely designated key pair internally within the integrated circuit component.

16 Claims, 9 Drawing Sheets

METHOD FOR PROVIDING A ROVING SOFTWARE LICENSE FROM ONE NODE TO ANOTHER NODE

RELATED APPLICATIONS

This is a divisional of a U.S. patent application (application Ser. No. 08/303,084) filed Sep. 7, 1994. The named inventor of the present application also has filed a number of co-pending United States patent applications entitled "Apparatus and Method for Providing Secured Communications" (Ser. No. 08/251,486) and "Key Cache Security System" (Ser. No. 08/365,347). These applications are owned by the same assignee of the present Application.

BACKGROUND OF THE INVENTION

1. Field of the Invention

The present invention relates to licensing software. More particularity, the present invention relates to an apparatus and method for transferring access privileges for executing a licensed software program from an authorized node having a first hardware agent to a non-authorized node having a second hardware agent without violating a specific-user license.

2. Background of Art Related to the Invention

Early in the evolution of computer systems, modernized businesses typically employed a room-sized, centralized mainframe having several "dumb" terminals connected to the mainframe. With the emergence of smaller, faster and more powerful computers, many of these modernized businesses have removed their centralized mainframes in favor of employing a number of stand-alone computers or a distributed network (e.g., a local area network) having a collection of personal computers, wherein each user has control over his or her own personal computer.

Observing this decentralizing trend, many software developers are licensing their software according to a particular licensing scheme commonly referred to as a "user-specific" license. The user-specific license generally permits a predetermined number of individuals to operate a particular software program in a specific manner at any given time. Thus, the license is associated with the select number of individuals and not to certain nodes. For the scope of this application, a "node" is defined as an hardware product having "intelligence" such as a computer, printer, facsimile machine and the like, preferably including the present invention. A paramount problem associated with user-specific software licenses is that it indirectly encourages unauthorized usage and/or copying of the licensed software which erodes potential licensing revenue for software developers.

For many years, software developers have sought a way of protecting their software from being used and copied beyond the terms of the user-specific license while business licensees have been attempting to greatly mitigate any potential vicarious liability from illegal usage or copying of licensed software by their employees. Thus, there exists an interest by both the software developers and the business licensees alike to prevent the proliferation of software beyond the terms of the user-specific license.

Currently, compliance with a user-specific software license is sometimes accomplished by using a physical hardware device referred to as a "dongle". A dongle is a physical hardware device that is packaged with the licensed software program when initially purchased. It typically couples to a parallel port of a node e.g., a personal computer.

At various times during execution, the licensed software program of interest will transmit an authorization message (referred to as a "challenge") to an active device employed within the dongle. The active device within the dongle processes the challenge using secret information (hereinafter referred to as a "valid license token") stored internally within the dongle and generates a return message (referred to as a "response"). The software program compares this response to an expected response and permits further execution only if these responses are identical.

Thus, while the user is able to copy the licensed software program and load it onto multiple personal computers, only a first personal computer, to which the dongle is connected, would be able to execute this software program. In order to execute the licensed software program on another personal computer, the dongle must be physically removed from the first personal computer and coupled to the other personal computer. As a result, the software on the first personal computer is disabled. It is clear that multiple installations of the licensed software program do not cause any adverse fiscal effects to the software developer because the number of dongles provided to the business licensee is generally limited to the number of persons agreed to under the user-specific software license.

Although the dongles ensure compliance with the user-specific license, it affords a number of disadvantages. One disadvantage is that the dongle must be physically delivered to the customer. Thus, while systems for electronic delivery of software (referred to as "content distribution") are being proposed and implemented to increase convenience and reduce distribution costs, the dongle, as a physical device, still requires the traditional distribution methodology with its associated costs. By requiring a dongle to protect the fiscal interests of the software developer, the customer would have to endure the onerous task of (i) directly obtaining the dongle at a chosen location and thereafter attaching the dongle to the node before being able to use the licensed software program, or (ii) ordering the licensed software program prior to its intended use so that the content distributor has time to mail the dongle to the customer. In any event, the dongle impedes the efficiency and appealability of content distribution.

Another disadvantage is that the removal and attachment of the dongle is a time-consuming process. In a time-sensitive business, the exchange of the dongle effects the overall performance of the business. A further disadvantage is continual removal and attachment of the dongle increases the likelihood of the dongle becoming damaged and non-functional, requiring the business to await the new dongle before being able to use the software application again.

Yet another disadvantage is that although the license is directed toward individuals, the dongle generally is attached to the node. Thus, if the user travels to another machine (e.g., a personal computer located at his or her home), he or she is precluded from using the licensed software program unless the user has possession of the dongle.

BRIEF SUMMARY OF THE INVENTION

Based on the foregoing, it would be desirable to construct a cryptographic device with the functionality of an electronic dongle as an integrated circuit component internally implemented within a node. Accordingly, it is an object of the present invention to provide an integrated circuit component for providing a roving software license without requiring continual physical manipulations of hardware.

The integrated circuit component, generally referred to as a hardware agent, comprising a processing unit for performing operations for identification purposes and a memory element including (i) non-volatile memory which stores a unique public/private key pair, (ii) a digital certificate which verifies the authenticity of the key pair and (iii) a public key of a chosen entity (preferably the manufacturer of the integrated circuit component) which enables communication between the integrated circuit component and other similar components fabricated by the manufacturer. The non-volatile memory also may be used contain cryptographic algorithms. The integrated circuit component further includes volatile memory that stores information processed by the processing unit, an interface in order to receive information in encrypted or decrypted format from and/or transmit information to other similar component(s) via a communication bus and a random number generator that produces the unique public/private key pair.

BRIEF DESCRIPTION OF THE DRAWINGS

The objects, features and advantages of the present invention will become apparent from the following detailed description of the present invention in which.

DETAILED DESCRIPTION OF THE INVENTION

The present invention relates to an apparatus and method for enabling a roving software license to be transferred between appropriately configured hardware agents thereby eliminating the need for a distributable physical hardware device. In the following description, numerous details are set forth in order to provide a thorough understanding of the present invention. However, it is apparent to one skilled in the art that the present invention may be practiced through many different embodiments than that illustrated without deviating from the spirit and scope of the present invention. In other instances, well-known circuits, elements and the like are not set forth in detail in order to avoid unnecessarily obscuring the present invention.

In the detailed description, a number of cryptography-related terms are frequently used to describe certain characteristics or qualities which is defined herein. A "key" is an encoding and/or decoding parameter for a conventional cryptographic algorithm. More specifically, the key is a sequential distribution ("string") of binary data being "n" bits in length, where "n" is an arbitrary number. A "message" is generally defined as information (e.g., encrypted keys address and data) being transferred in a sequence of bus cycles. The information may include a challenge or a return response. A "digital certificate" is defined as any information pertaining to an entity initiating communications, typically its public key, encrypted through use of a private key by a widely published trusted authority (e.g., bank, governmental entity, trade association, etc.). A "digital signature" is similar to a digital certificate but is used for authentication of the message itself, not the sender.

In recent years, it is becoming more and more desirable to transmit digital information from one location to another. As a result, many entities are now using cryptographic technology so that the information is transferred in a manner which is clear and unambiguous to a legitimate receiver, but incomprehensible to any illegitimate recipients. Typically, cryptographic technology operates in accordance with one of two conventional techniques; namely, symmetric key cryptography or asymmetric (or public) key cryptography or a combination of these cryptographic technologies.

Figure 1:
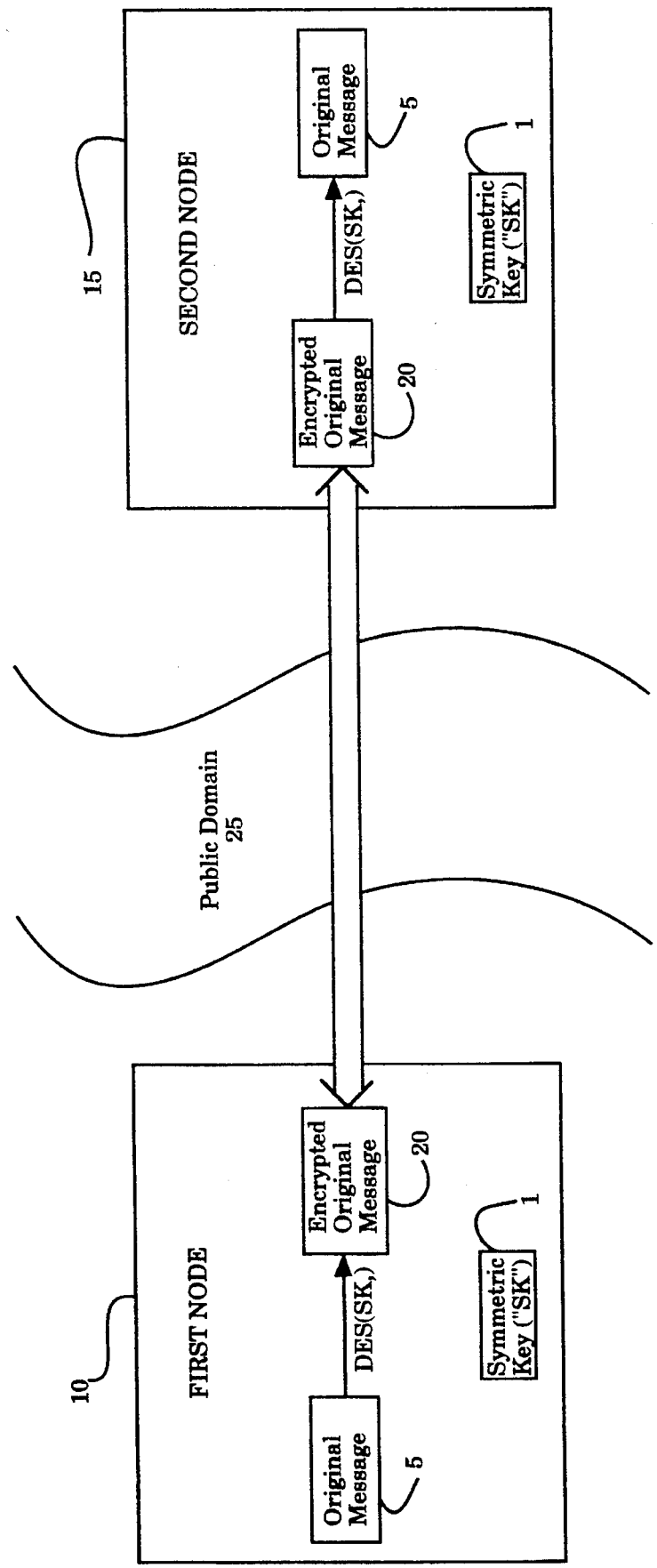
FIG. 1 is a block diagram illustrating a bidirectional symmetric key encryption and decryption process.

Referring to FIG. 1, an illustrative embodiment of the symmetric key cryptography technique is illustrated. This technique requires the use of an identical i.e., symmetric secret key (labeled "SK") 1 to encrypt an original message 5 being transmitted between a first node 10 and a second node 15 to form an encrypted original message 20 and to decrypt the encrypted original message 20 to recover the original message 5. Such encryption and decryption is performed through well-known conventional cryptographic algorithms such as, for example, the Data Encryption Algorithm, more commonly referred to as "DES". The original message 5 is (i) encrypted at the first node 10, (ii) transmitted from the first node 10 to the second node 15 through a public domain 25 such as a telephone lines and the like and (iii) decrypted at the second node 15. However, this technique is difficult to support with a large number of users because it requires prior establishment of secret keys ("SK").

Figure 2:
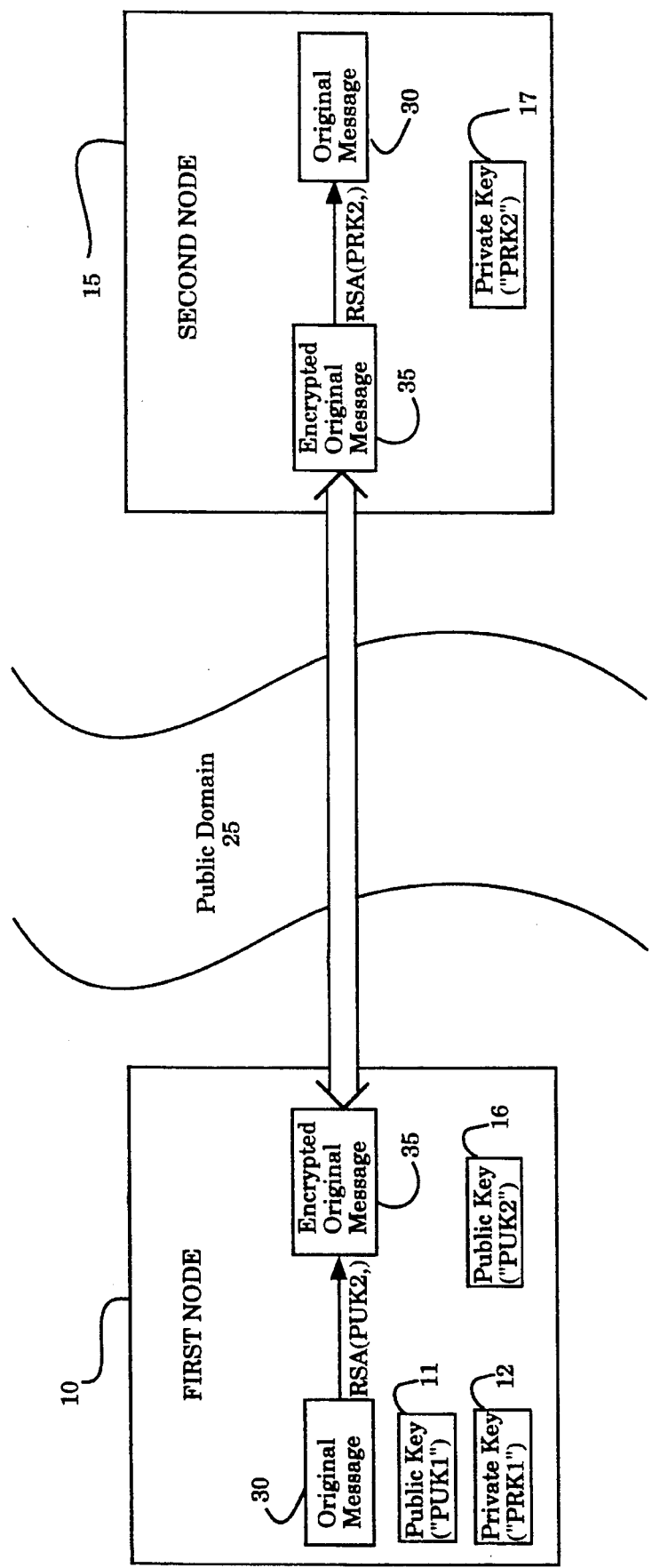
FIG. 2 is a block diagram illustrating a bidirectional asymmetric key encryption and decryption process.

Referring now to FIG. 2, an illustrative embodiment of the asymmetric key technique is shown. This technique employs two separate keys (referred to as a "public key" and "private key") being used separately for encryption and decryption purposes. For establishing bidirectional communications from the first node 10 to the Second node 15, a "public" key 16 of the key pair of the second node 15 (labeled "PUK2") is stored in and generally used by the first node 10 to encrypt an original message 30 under an asymmetric "RSA" algorithm well known in cryptography. This forms an encrypted original message 35 to be transmitted to the second node 15. A public and private key pair 11 and 12 of the first node 10 (labeled "PUK1" and "PRK1") are further stored in the first node 10.

A "private" key 17 of the key pair of the second node 15 (labeled "PRK2") is exclusively known and used by the second node 15 for many purposes, including to decrypt the encrypted message 35 from the first node 10 under the RSA algorithm as shown in FIG. 2. However, this technique is susceptible to attempts by an illegitimate entity (e.g., commercial spy) to impersonate a legitimate entity (e.g., employee, joint-venturer, etc.) by sending fraudulent messages to another legitimate entity for the purpose of disrupting work flow or obtaining confidential information. Thus, additional protocols are commonly used to authenticate a message and legitimize the entity sending the message.

Authentication of the sender (i.e., verifying that the sender of a public key is, in fact, the true owner of the public key) is a problem when communications are initially established between previously unknown parties. This problem is commonly avoided by incorporating a digital certificate 45 within a transmission message 50. The digital certificate 45 is issued by a mutually trusted authority 55 (e.g., a bank, governmental entity, trade association, etc.) by encrypting a public key of the node initiating the communications ("PUK1") 11 with a signature statement (labeled "SM") 58 with a private key ("PRKTA") 57 of the trusted authority 55 so that fraudulent attempts to use PUK2 16 will simply result in an unreadable response to the transmission message by its recipient. The selected trusted authority 55 depends on the parties involved. For example, two individuals employed by the same business could both trust the certificates issued by a corporate security office of the business. Employees of two independent business entities, however, would require not only the certificates from the respective security offices, but also the certificates from, for example, some industry trade organization that certifies such business entities.

In this approach, multiple operations are concurrently performed to construct the transmission message 50. One operation is that the original message 40 is encrypted using a symmetric secret key (SK") 60 via the DES algorithm to form the encrypted message 65 which is input into the transmission message 50 along with the digital certificate 45. The original message 40 also undergoes a hash algorithm 70 (e.g., "MD5") to form a transmitted message digest 75. The transmitted message digest 75 is further encrypted using a private key of the first node ("PRK1") 12 to form a digital signature 80 which is input into the transmission message 50. Additionally, the symmetric key ("SK") 60 is encrypted with a public key of the second node ("PUK2") 16 under the RSA algorithm resulting in "$SK_{enc}$" 85 and further input to the transmission message 50.

Figure 3:
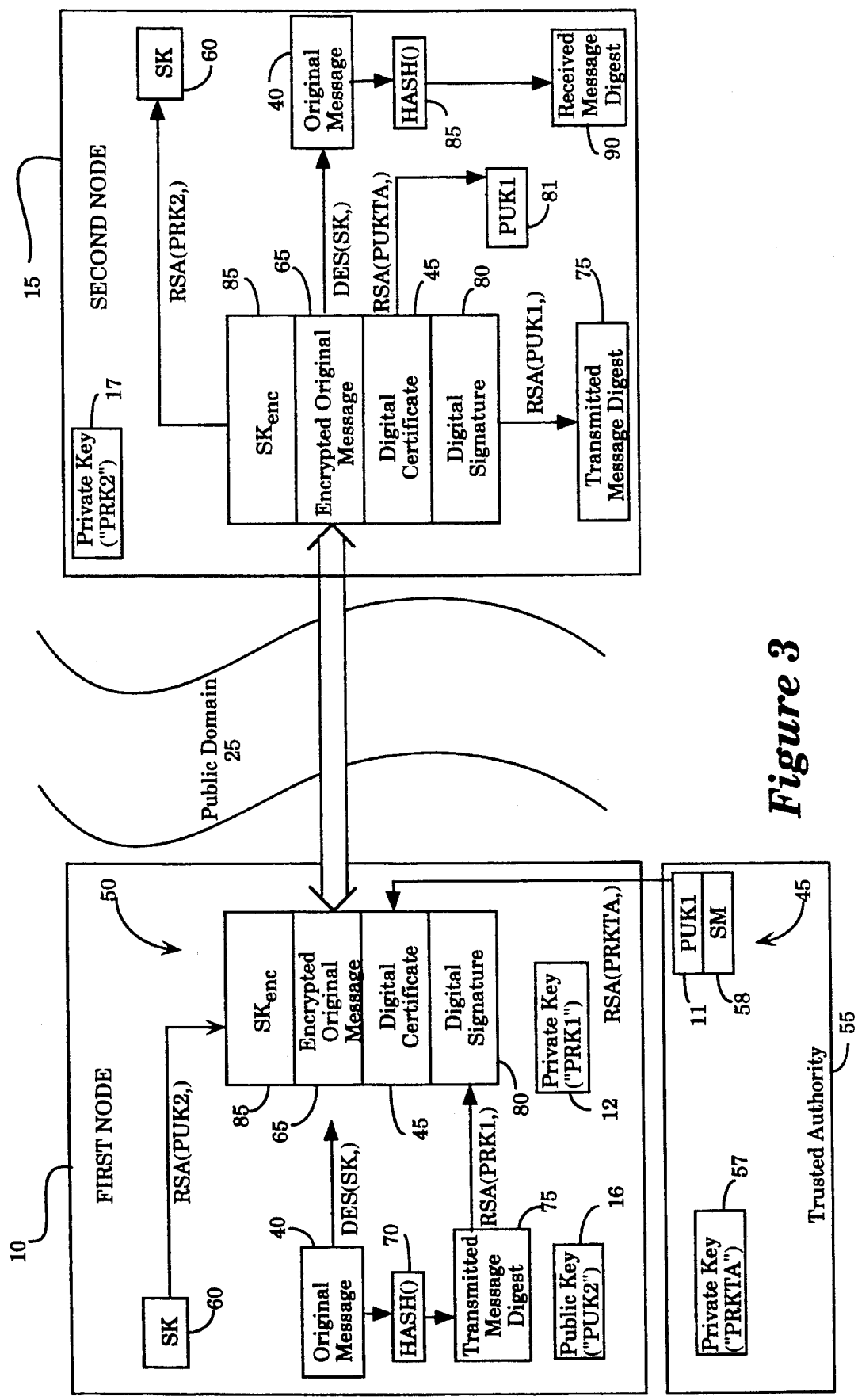
FIG. 3 is a block diagram illustrating a digital certification process from a trusted authority.

Referring still to FIG. 3, upon receipt of the transmission message 50 from the first node 10 being transmitted through the public domain 25, the second node 15 decrypts the $SK_{enc}$ 85 with its private key CPRK2") 17 and the digital certificate 45 with a published public key ("PUBTA") of the trusted authority 55 to obtain SK 60 and PUK1 11. These SK and PUK1 keys 60 and 11 are used to decrypt the encrypted original message 65 and the digital signature 80 to retrieve the transmitted message digest 75 and the original message 40, respectively. The original message 40 then undergoes a hash algorithm 85, identical to that performed in the first node 10. The results (referred to as a "received message digest") 90 are compared to the transmitted message digest 75. If the transmitted message digest 75 is identical to the received message digest 90, communications are maintained between these legitimate nodes.

Figure 4:
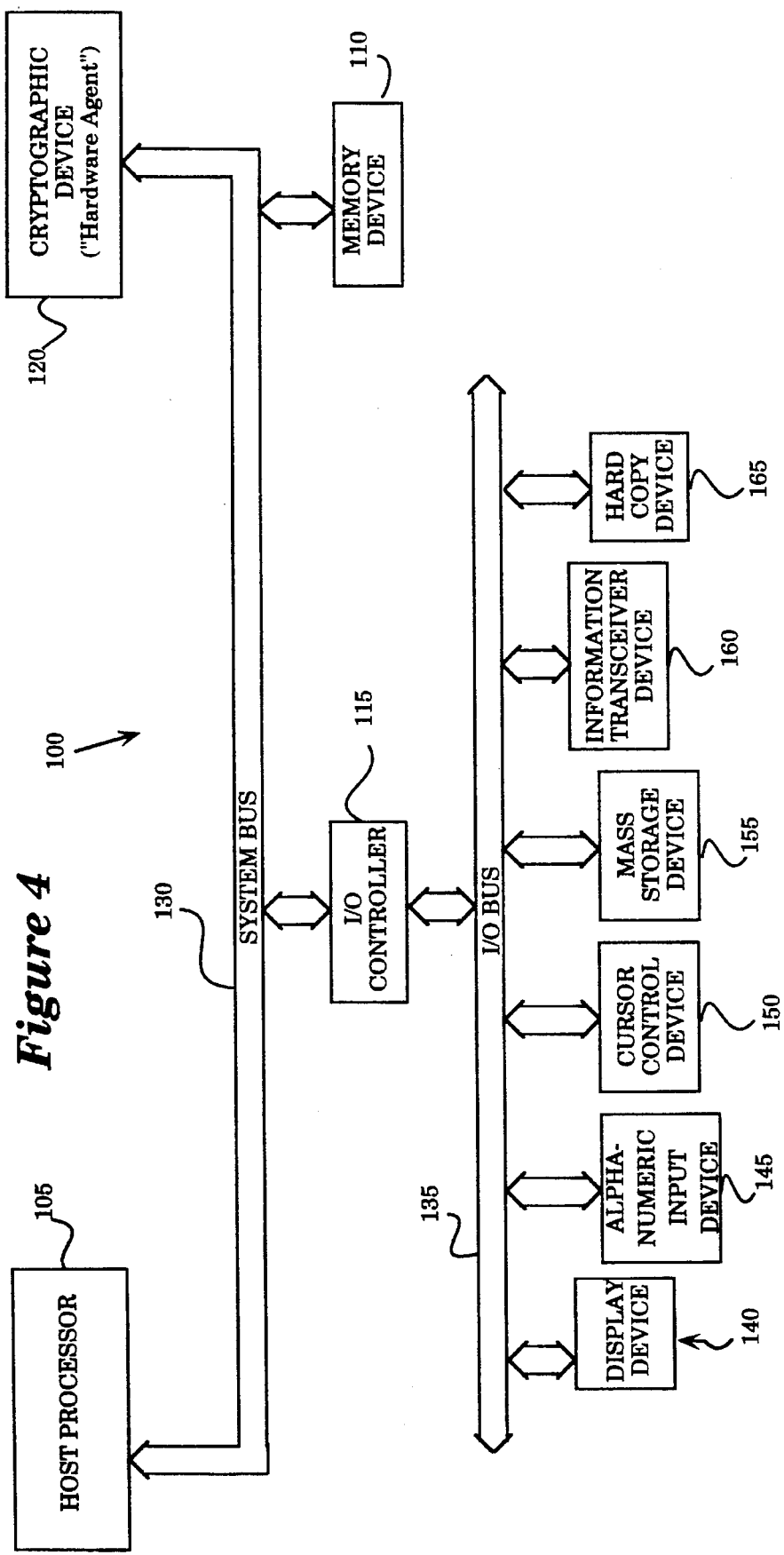
FIG. 4 is a block diagram of a computer system incorporating an embodiment of the present invention.

Referring to FIG. 4, an illustrative embodiment of a computer system 100 utilizing the present invention is illustrated. The computer system 100 comprises a plurality of bus agents including a host processor 105, a memory device 110, an input/output ("I/O") controller 115 and a cryptographic device referred to as a "hardware agent" 120. The plurality of bus agents are coupled together through a system bus 130 which enables information to be communicated between these bus agents.

Being well-known in the computer industry, it is contemplated that more than one host processor could be employed within the computer system 100 although only the host processor 105 is illustrated in this embodiment. Moreover, the memory device 110 may include dynamic random access memory ("DRAM"), read only memory ("ROM"), video random access memory ("VRAM") and the like. The memory device 110 stores information for use by the host processor 105.

The I/O controller 115 is an interface between an I/O bus 135 and the system bus 130 which provides a communication path (i.e., gateway) for transferring information between components coupled to the system bus 130 or the I/O bus 135. The I/O bus 135 transfers information into and from at least one peripheral device in the computer system 100 including, but not limited to a display device 140 (e.g., cathode ray tube, liquid crystal display, etc.) for displaying images; an alphanumeric input device 145 (e.g., an alphanumeric keyboard, etc.) for communicating information and command selections to the host processor 105; a cursor control device 150 (e.g., a mouse, trackball, touch pad, etc.) for controlling cursor movement; a mass data storage device 155 (e.g., magnetic tapes, hard disk drive, floppy disk drive, etc.) for storing information; an information transceiver device 160 (fax machine, modem, scanner etc.) for transmitting information from the computer system 100 to another device and for receiving information from another device; and a hard copy device 165 (e.g., plotter, printer, etc.) for providing a tangible, visual representation of the information. It is contemplated that the computer system shown in FIG. 4 may employ some or all of these components or different components than those illustrated.

Figure 5:
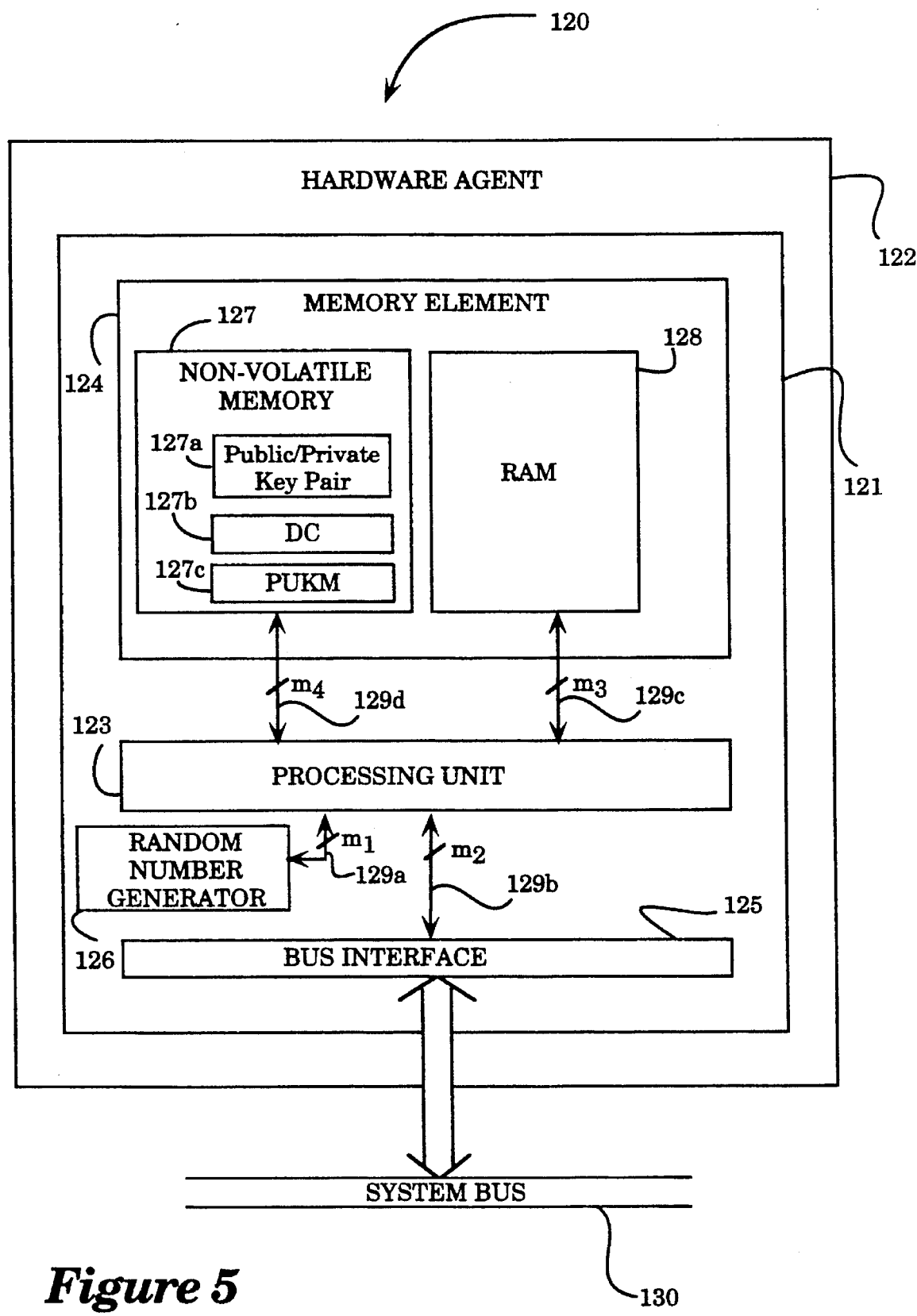
FIG. 5 is a block diagram of an embodiment of the present invention.

Referring now to an embodiment of the present invention as shown in FIG. 5, the hardware agent 120 is coupled to the system bus 130 establishing a communication path with the host processor 105 as well as the memory and I/O controllers (not shown). The hardware agent 120 comprises a single integrated circuit in the form of a die 121 (e.g., a microcontroller) encapsulated within an integrated circuit component package 122, preferably hermetically, to protect the die 121 from damage and harmful contaminants. The die 121 comprises a processing unit 123 coupled to a memory element 124, a bus interface 125 and a number generator 126. The bus interface 125 enables communication from the hardware agent 120 to another device (e.g., the host processor, another hardware agent in another device, etc.). The processing unit 123 performs computations internally within a secured environment within the die 121 to confirm a valid connection with an authorized receiver. Such computations include executing certain algorithms and protocols, activating circuitry (e.g., the number generator 126 being preferably random in nature) for generating a device-specific public/private key pair and the like. The processing unit 123 is placed within the die 121 to prevent access of the private key through virus attack, which is a common method of disrupting a computer system to obtain its private key and other information.

Figure 6:
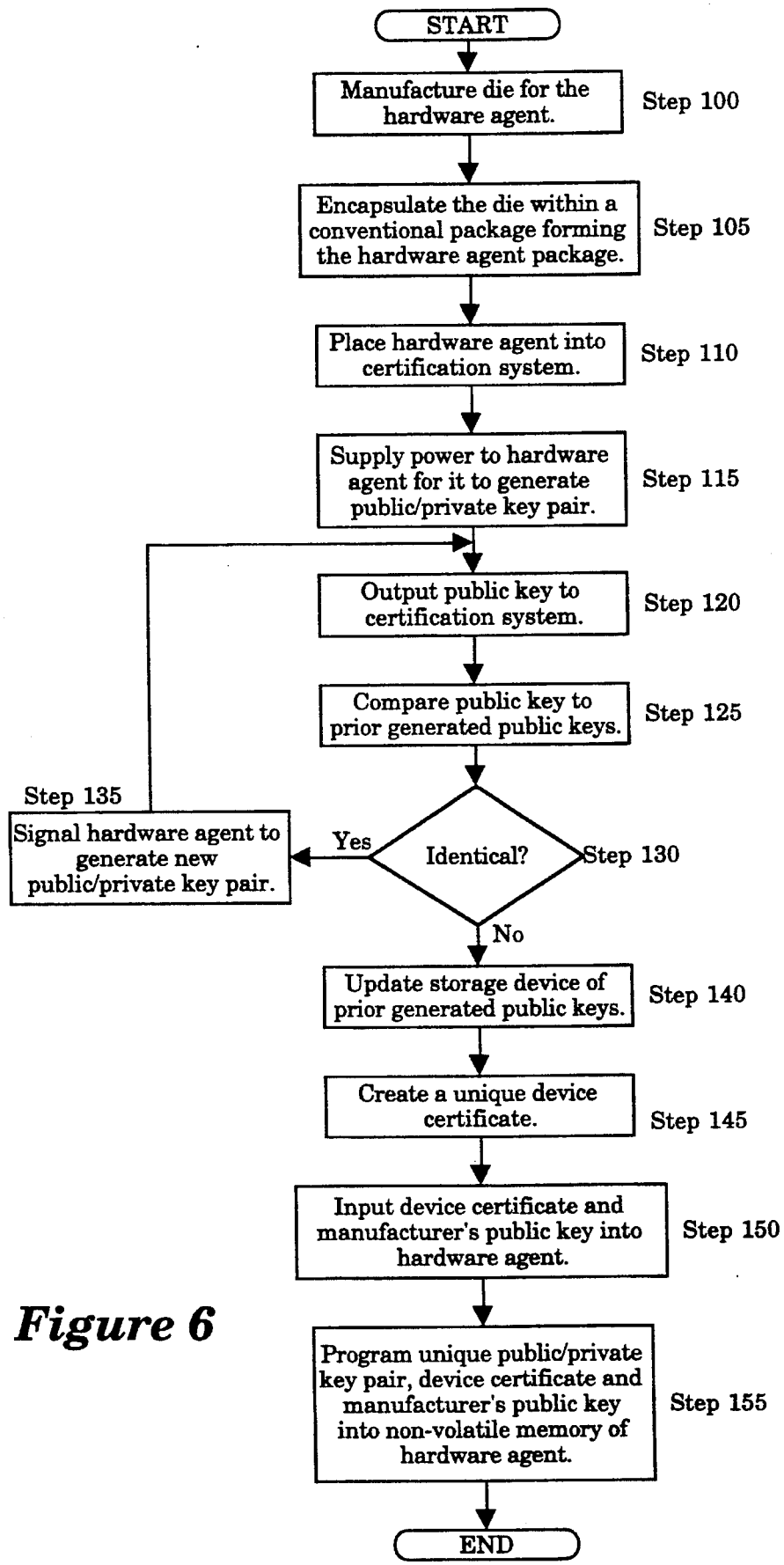
FIG. 6 is a flowchart illustrating the method for implementing pair and digital certificate into an integrated circuit component.

The memory element 124 includes a non-volatile memory element 127, such as flash memory, which stores appropriate cryptographic algorithms such as "RSA" and "DES", the public/private key pair 127a, a digital certificate for verifying the authenticity of the key pair (labeled "DC") 127b and a public key of the manufacturer of the integrated circuit component ("PUKM") 127c for enabling communication between the integrated circuit component and another similar device fabricated by the manufacturer (discussed in more detail in FIG. 6). This non-volatile memory 127 is used primarily because it retains its contents when supply power is discontinued. The memory unit 124 further includes random access memory ("RAM") 128 in order to store certain results from the processing unit 123.

Although the hardware agent 120 is implemented as a peripheral device on the system bus 130 for greater security, it is contemplated that the hardware agent 130 could be implemented in several other ways at the PC platform level such as, for example, as a disk controller or PCMCIA card to automatically decrypt and/or encrypt information being inputted and outputted from a hard disk. Another alternative implementation would be for the hardware agent to be one component of a multi-chip module including the host processor as discussed below. Furthermore, even though the hardware agent is described in connection with PC platforms, it is contemplated that such hardware agent could be implemented within node such as a fax machine, printer and the like or on a communication path between a computer and the I/O peripheral device.

Referring to FIG. 6, a flowchart of the operations for manufacturing the present invention is illustrated. First, in Step 100, the die of the hardware agent is manufactured according to any conventional well-known semiconductor manufacturing technique. Next, the die is encapsulated within a semiconductor package so as to form the hardware agent itself (Step 105). The hardware agent is placed onto a certification system which establishes an electrical and mechanical coupling between the hardware agent and the certification system (Step 110). The certification system comprises a carrier coupled to a printed circuit board for generating and receiving electrical signals for certification of the hardware agent. The certification system further comprises a storage device (e.g., a database) of previously generated public keys to guarantee unique key generation. Thereafter, the certification system supplies power to the hardware agent which powers the random number generator enabling it to generate a device-specific public/private key pair internally within the hardware agent (Step 115).

After the public/private key pair has been generated within the hardware agent, the public key of the public/private key pair is transmitted to the certification system (Step 120). The public key is compared with those previously generated public keys from previously manufactured hardware agents being stored in the storage device (Step 125). In the unlikely event that the public key is identical to one of the previously generated public keys (Step 130), the hardware agent is signaled by the certification system to generate another such public/private key pair (Step 135) and continue this process from Step 120 to ensure that each public/private key pair is unique.

In the event that the public key is unique, the storage device is updated with this unique public key (Step 140). Thereafter, in Step 145, the certification system creates a unique device certificate verifying the authenticity of the key pair (hereinafter referred to as the "authentication device certificate"). The authentication device certificate will include at least the public key of the device "digitally signed" with the secret private manufacturing key (i.e. in general terms, encrypting the public key of the device with the manufacturer's private key). This authentication device certificate along with the manufacturer's generally known public key are input to the hardware agent (Step 150) and the hardware agent permanently programs the unique public/private key pair, the authentication device certificate and the manufacturer's public key into its non-volatile memory (Step 155). It is contemplated, however that the public key of another entity (e.g., distributor) may be used in lieu of the manufacturer requiring modification of the authentication device certificate as well. At this point, the hardware agent is physically unique and is now capable of securely establishing communications with another hardware agent.

After the hardware agent is constructed, it is implemented into an electronic device such as the computer system illustrated in FIG. 4. This is accomplished by establishing a secure communication path between the licenser and the hardware agent through authentication procedures such as challenge/response as well as any other well-known procedures. After the communication path is secure, the valid license token is downloaded into flash memory of the hardware agent through the secure communication link. It is further contemplated that the license token may be incorporated within multiple hardware agents to exist in either a "valid" or "invalid" state whereby the license token is validated or invalidated rather than being transferred between hardware agents.

Figure 7A:
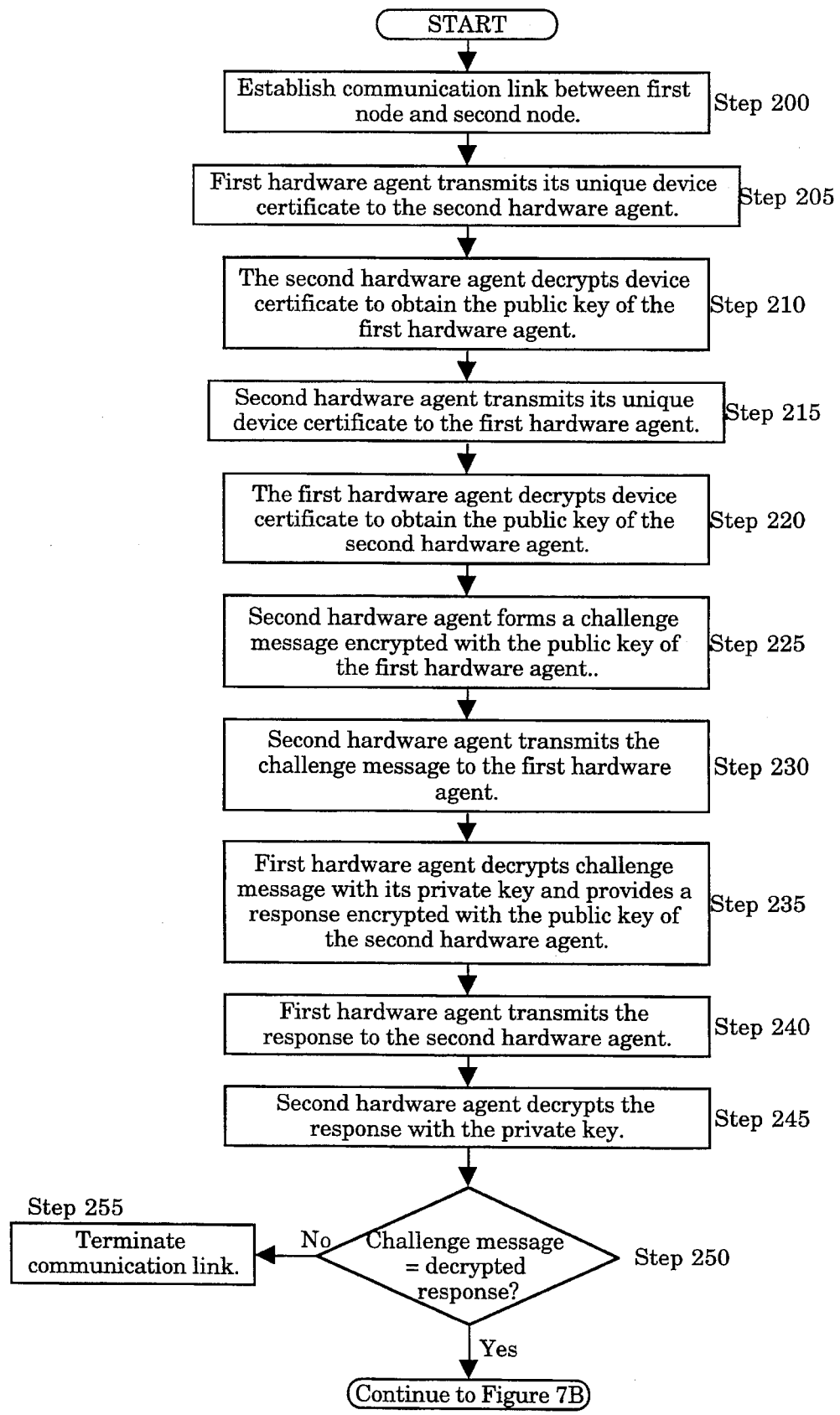
FIGS. 7A–7C are flowcharts illustrating the operations of a first hardware agent establishing communications with a second hardware agent in order to transfer a valid license token between the second hardware agent having licensed privileges and the first hardware agent.
Figure 7B:
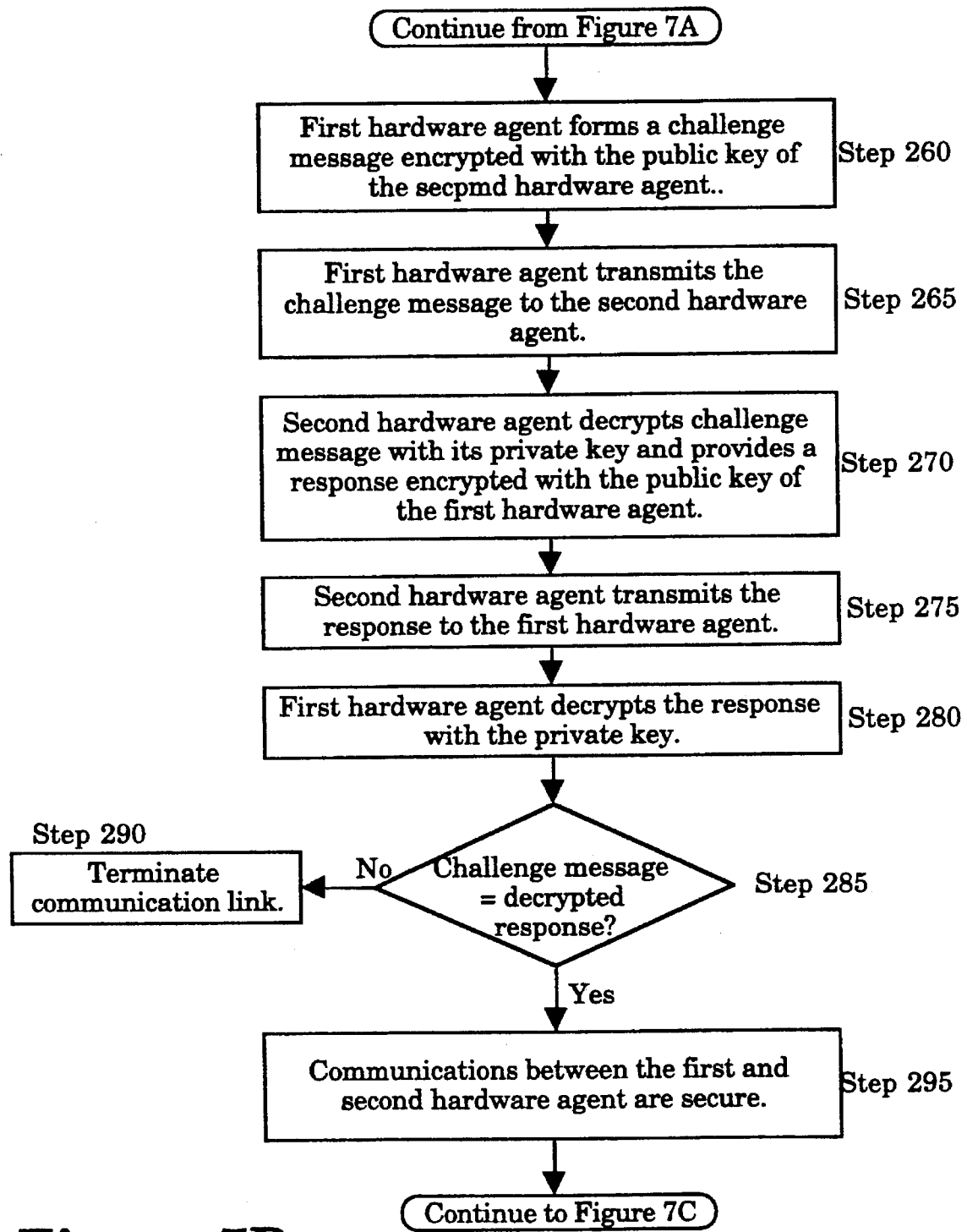

Referring to FIGS. 7A and 7B, an illustrative embodiment of mutual remote identification of authentication of two hardware agents is illustrated. In Step 200, a communication link is established between a "non-authorized" first node (i.e., a node not currently permitted to operate a licensed software application) incorporating a first hardware agent and an authorized second node incorporating a second hardware agent which is authorized to operate the licensed software application. This communication link may be established through any conventional means such as modems, networks, etc. The first hardware agent outputs a message including its unique authentication device certificate to the second hardware agent (Step 205). Since the manufacturer's public key ("PUKM") is programmed in non-volatile memory of both hardware agents, the second hardware agent decrypts the authentication device certificate with the manufacturer's public key ("PUKM") to obtain the public key of the first hardware agent (Step 210). Thereafter, in Steps 215–220, operations similar to those discussed in Steps 205–210 are also conducted so that the first agent obtains the public key ("PUK2") of the second hardware agent.

Thereafter, in Step 225 and 230, using the derived public key of the first hardware agent, the second hardware agent encrypts a challenge message according to a chosen cryptographic algorithm (e.g., RSA) and transmits the challenge message to the first hardware agent. In step 235 and 240, the first hardware agent decrypts the challenge message with its private key ("PRK1") and generates a response message by encrypting the decrypted challenge message with the public key of the second hardware agent ("PUK2") and transmits the response message to the second hardware agent. Then, the second hardware agent decrypts the response with its private key ("PUK1") as previously determined through decryption of the previously transmitted manufacturer's device certificate (Step 245). In Step 250, the second hardware agent compares the original challenge message to the decrypted response message and if not identical, the communications are terminated (step 255). Otherwise, in Steps 260–290, a challenge/response procedure similar to Steps 225–260 is conducted to verify that the second hardware agent is in fact receiving the information transmitted from the first hardware agent. Successful completion of these steps (225–290) assures that both hardware agents are authentic and communications between them are secure (Step 295).

Figure 7C:
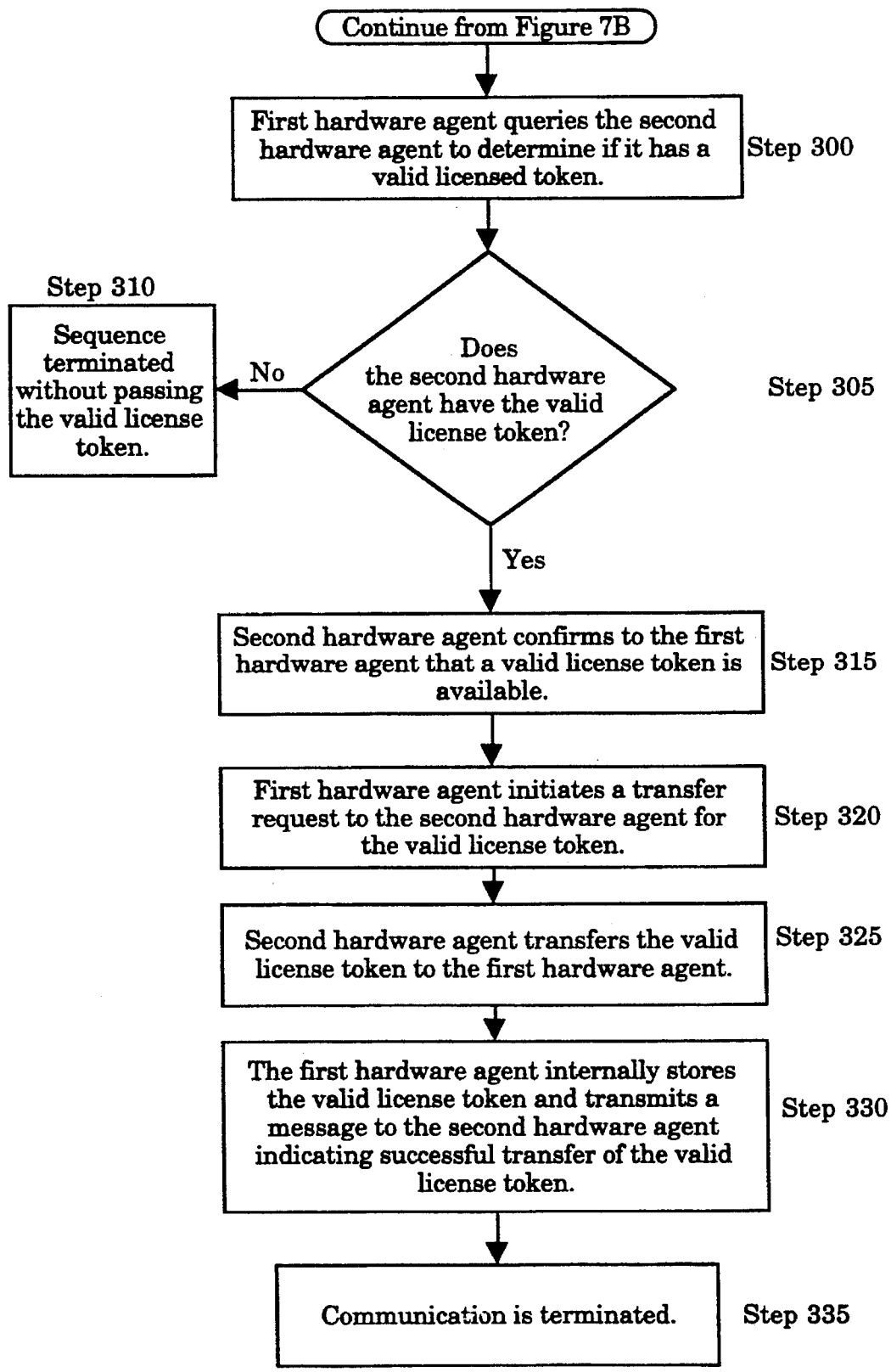

Referring now to FIG. 7C, an illustrative embodiment of the process of securely transferring the valid license token within the second hardware agent to the first hardware agent under secure communications is illustrated. After secure communications are established, the first hardware agent queries the second hardware agent as to whether it has possession of a valid license token (Step 300). If the system incorporating the second hardware agent does not have the valid license token (Step 305), communications between the hardware agents are terminated (Step 310). However, if the system incorporating the second hardware agent has the valid license token, it transmits a message to the first hardware agent accordingly (Step 315).

Upon receiving this message, the first hardware agent initiates a transfer request of the valid license token allowing the first hardware agent to operate the licensed software application (Step 320). The second hardware agent responds to the transfer request by transferring the valid license token causing it to lose its license privileges (Step 325). The first hardware agent receives the valid license token and stores the token within the its non-volatile memory and thereafter, it would transmit a message to the second hardware agent that it has received the valid license token enabling its copy of the licensed software (Step 330). At this point, communications would be terminated (Step 335).

It is contemplated that an additional level of protocol integrity could be obtained by introducing challenge/response sequences between Steps 320 and 325 and Steps 325 and 330. This prevents "replay" of previous license token transfer events.

Concurrently with the communication between the first and second hardware agents, each hardware agent would store the contents of its transmissions in non-volatile memory as an audit log. Thus, in case communications are disconnected after the second hardware agent disabled its copy but before the first hardware agent enabled its copy, both hardware agents could review the audit logs after communications are re-connected to determine which hardware agent (if any) has authorization to operate the licensed software application.

The present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follows.

What is claimed is:

1. A method for transferring a valid license token between a first and second nodes which allows execution of a licensed software program after the valid license token had been initially provided by a software supplier, the method comprising the steps of:

establishing a communication link between a first cryptographic device of the first node and a second cryptographic device of the second node;

authenticating said first and second cryptographic devices prior to transferring the valid license token there between;

transmitting a query message from said first cryptographic device to said second cryptographic device in order to determine whether said second cryptographic device possesses said valid license token;

generating a transfer request message from said first cryptographic device to said second cryptographic device if said second cryptographic device possesses said valid license token;

transferring said valid license token from said second cryptographic device to said first cryptographic device;

generating a token received message from said first cryptographic device to said second cryptographic device after receipt of said valid license token; and terminating said communication link.

2. The method according to claim 1, wherein the authenticating step includes the steps of:

transmitting a unique device certificate stored in said first hardware agent to said second hardware agent; and decrypting said unique device certificate to obtain a public key of the first hardware agent for communicating with and authenticating said first hardware agent.

3. The method according to claim 2, wherein the authenticating step further includes the steps of:

transmitting a unique device certificate stored in said second hardware agent to said first hardware agent; and decrypting said unique device certificate to obtain a public key of the second hardware agent for communicating with and authenticating said second hardware agent.

4. The method according to claim 3, wherein the authenticating step further includes the steps of:

generating a first challenge message being encrypted by said public key of said second cryptographic device;

transmitting said first challenge message from said first cryptographic device to said second cryptographic device;

decrypting said first challenge message and responding to said first challenge message by said second cryptographic device;

generating a second challenge message being encrypted by said public key of said first cryptographic device;

transmitting said second challenge message from said second cryptographic device to said first cryptographic device; and decrypting said second challenge message and responding to said second challenge message by said first cryptographic device.

5. The method according to claim 1, wherein prior to the step of generating a transfer request, the method further include the steps of:

determining by said second hardware agent as to whether said second hardware agent possesses said valid license token thereby:

terminating said communication link if said second hardware agent does not possess said valid license token, and generating a response message to said query message if said second hardware agent possesses said valid license token.

6. A method for acquiring a valid license token from a second cryptographic device of a second node currently possessing the valid license token initially obtained from a software supplier that allows a first node having a first cryptographic device to gain access privileges to execute a licensed software program, the method comprising the steps of:

establishing a communication link between the first and second cryptographic devices;

authenticating said first and second cryptographic devices by exchanging messages in an encrypted format between said first and second cryptographic devices;

transferring said valid license token from said second cryptographic device to said first cryptographic device; and terminating said communication link.

7. The method according to claim 6, wherein the authenticating step includes the steps of transmitting a unique device certificate stored in said first hardware agent to said second hardware agent; and decrypting said unique device certificate to obtain a public key of the first hardware agent for communicating with and authenticating said first hardware agent.

8. The method according to claim 7, wherein the authenticating step further includes the steps of transmitting a unique device certificate stored in said second hardware agent to said first hardware agent; and decrypting said unique device certificate to obtain a public key of the second hardware agent for communicating with and authenticating said second hardware agent.

9. The method according to claim 8, wherein the authenticating step further includes the steps of generating a first challenge message being encrypted by said public key of said second cryptographic device;

transmitting said first challenge message from said second cryptographic device to said first cryptographic device;

decrypting said first challenge message and responding to said first challenge message by said first cryptographic device;

generating a second challenge message being encrypted by said public key of said first cryptographic device;

transmitting said second challenge message to said first cryptographic device; and decrypting said second challenge message and responding to said second challenge message by said first cryptographic device.

10. The method according to claim 6, wherein prior to the transferring step, the method further includes the step of transmitting a query message from said first hardware agent to said second hardware agent in order to determine whether said second hardware agent possesses a valid license token.

11. The method according to claim 10, wherein after the transmitting step, the method further includes the steps of generating a transfer request message from said first hardware agent to said second hardware agent if said second hardware agent possesses said valid license token.

12. The method according to claim 11, wherein prior to the step of generating a transfer request, the method further include the steps of:

determining by said second hardware agent as to whether said second hardware agent possesses said valid license token, wherein terminating said communication link if said second hardware agent does not possess said valid license token, and alternatively generating a response message to said query message if said second hardware agent possesses said valid license token.

13. The method according to claim 12, wherein before the terminating step, the method further comprises the step of generating a token received message from said first hardware agent to said second hardware agent after receipt of said valid license token.

14. A method for transferring a valid license token between a first cryptographic device of a first node and a second cryptographic device of a second node in order to gain access privileges to execute a licensed software program after the valid license token has been initially provided to a software supplier, the method comprising the steps of:

establishing a communication link between the first and second cryptographic devices;

authenticating the first and second cryptographic devices by exchanging messages in an encrypted format between said first and second cryptographic devices;

determining whether the second cryptographic device possesses a valid license token; and transferring said valid license token from said second cryptographic device to said first cryptographic device if the second cryptographic device possesses said valid license token.

15. A first integrated circuit component adapted for exchanging a license token, necessary for executing a licensed software program, with a second integrated circuit component distantly separated from the first integrated circuit component, said first integrated circuit component comprising:

a first memory which contains a designated key pair, a device certificate of a manufacturer of the first integrated circuit component, a public key of said manufacturer and the license token;

a second memory element which contains information;

a processing unit coupled to said first memory element and said second memory element, said processing unit receiving and, internally processing information transmitted from the second integrated circuit component so that the key pair, the device certificate and the public key are not accessible outside the first integrated circuit component; and a random number generator coupled to said processing unit, said random number generator producing said key pair internally within the first integrated circuit component.

16. A system adapted for transferring a license token to and from a remote system, the system comprising:

a bus;

a memory element coupled to said bus;

a host processor coupled to said bus; and a cryptographic device coupled to said bus, said cryptographic device internally decrypting input information including the license token encrypted by said remote system and encrypting output information including the license token prior to transmission to said remote system, said cryptographic device including a processor which executes an encryption and decryption program within said cryptographic device to obtain the license token, a designated key pair, an authentication device certificate and a manufacturer public key contained in a first storage element coupled to said processor, all of said key pair, said authentication device certificate and said manufacturer public key is being used to decrypt said input information and encrypt said output information, a second storage element coupled to said processor, said second storage element contains said input and output information processed by said processor, and a random number generator coupled to said processor, said random number generator producing said key pair inaccessible outside said cryptographic device.

* * * * *